United States Patent [19]

Heninger

[11] Patent Number: 5,128,528
[45] Date of Patent: Jul. 7, 1992

[54] MATRIX ENCODING DEVICES AND METHODS

[75] Inventor: Byrne E. Heninger, Gainesville, Ga.

[73] Assignee: Dittler Brothers, Incorporated, Atlanta, Ga.

[21] Appl. No.: 597,434

[22] Filed: Oct. 15, 1990

[51] Int. Cl.[5] ............................................. G06K 7/10
[52] U.S. Cl. .................................. 235/470; 235/456; 235/494
[58] Field of Search ............... 235/380, 456, 470, 494; 382/61

[56] References Cited

U.S. PATENT DOCUMENTS

| | | |
|---|---|---|
| 2,000,403 | 5/1935 | Maul . |
| 2,612,994 | 10/1952 | Woodland et al. . |
| 2,925,586 | 2/1960 | Levy . |
| 3,309,667 | 3/1967 | Feissel et al. . |
| 3,409,760 | 11/1968 | Hamisch . |
| 3,474,230 | 10/1969 | McMillen . |
| 3,492,660 | 1/1970 | Halverson . |
| 3,506,783 | 4/1970 | Mo et al. . |
| 3,529,133 | 9/1970 | Kent et al. . |
| 3,543,007 | 11/1970 | Brinker et al. . |
| 3,643,068 | 2/1972 | Mohan et al. . |
| 3,760,161 | 9/1973 | Lohne et al. . |
| 3,774,758 | 11/1973 | Sternberg . |
| 3,792,236 | 2/1974 | Dobras et al. . |
| 3,811,033 | 5/1974 | Herrin et al. . |
| 3,870,865 | 3/1975 | Schneiderhan et al. . |
| 3,894,756 | 7/1975 | Ward . |
| 3,925,611 | 12/1975 | Dennis . |
| 4,034,210 | 7/1977 | Hill et al. . |
| 4,159,468 | 6/1979 | Barnes et al. . |
| 4,163,570 | 8/1979 | Greenaway . |
| 4,180,284 | 12/1979 | Ashley . |
| 4,211,918 | 7/1980 | Nyfeler et al. . |
| 4,239,261 | 12/1980 | Richardson . |

(List continued on next page.)

FOREIGN PATENT DOCUMENTS 0081316 6/1983 United Kingdom .
0155982 10/1985 United Kingdom .

OTHER PUBLICATIONS

Chibnik, Michael, "CCD Cameras: Digital Astrophotography is Here," *Astronomy*, Oct. 1990, cover sheet and pp. 66–73.

Harmon, Craig K. and Russ Adams, *Reading Between the Lines: An Introduction To Bar Code Technology*, Helmers Publishing, Inc., pp. 16–17, 36–37, 238–239, 260–263, 266–267.

The brochure entitled "Expert PVS 2805 Programmable Vision System," Publication 2805-1.3-Feb. 1988 (29 pages).

*Primary Examiner*—Harold Pitts
*Attorney, Agent, or Firm*—Kilpatrick & Cody

[57] ABSTRACT

Matrices, devices and processes for identifying articles. The matrices employ a pattern of dots which may be decoded by an imager such as those use in CCD cameras. A reference marker, information dots corresponding to characters in a selected symbology system and a reference cue which may be part of the reference marker or information dots, or a separate mark, are interpreted by comparing distances between the reference marker and information dots, and the angles of the information dots to the reference cue relative to the reference marker in order to produce a series of vectors. The vectors may be scaled for distance and compensated for attitude of the matrices relative to the imager, and are compared to information in a database in order to identify characters in the symbology system that correspond to the information dots. The characters may be stored and compared to database information such as, for instance, a list of names and addresses. The matrices may be placed in a far smaller area than conventional bar code symbols, may be produced using a far broader range of media and inks than conventional bar coding technology, and may appear in a far less obtrusive and conspicuous manner because of reflectance tolerances enjoyed by CCD imager technology not present in conventional bar coding technology.

19 Claims, 6 Drawing Sheets

U.S. PATENT DOCUMENTS

| | | |
|---|---|---|
| 4,286,146 | 8/1981 | Uno et al. . |
| 4,300,123 | 11/1981 | McMillin et al. . |
| 4,489,318 | 12/1984 | Goldman . |
| 4,591,704 | 5/1986 | Sherwood et al. . |
| 4,614,366 | 9/1986 | North et al. . |
| 4,630,844 | 12/1986 | Troy et al. . |
| 4,637,634 | 1/1987 | Troy et al. . |
| 4,660,221 | 4/1987 | Dlugos . |
| 4,736,109 | 4/1988 | Dvorzsak . |
| 4,748,679 | 5/1988 | Gold .................................. 235/380 |
| 4,752,675 | 6/1988 | Zetmeir . |
| 4,760,247 | 7/1988 | Keane et al. . |
| 4,814,589 | 3/1989 | Storch .......................... 235/494 X |
| 4,924,078 | 5/1990 | Sant'Anselmo et al. . |
| 4,939,354 | 7/1990 | Priddy et al. . |
| 4,972,475 | 11/1990 | Sant'Anselmo . |

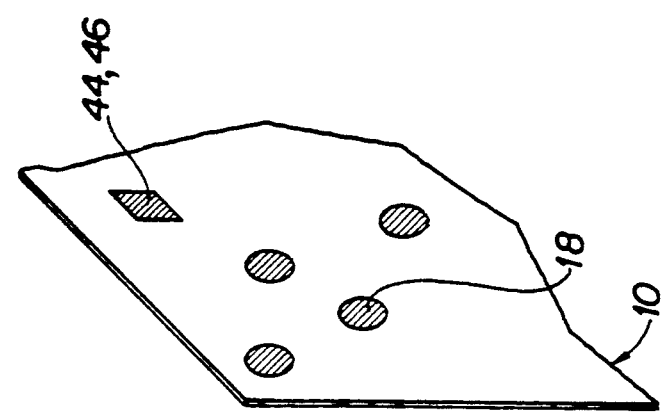
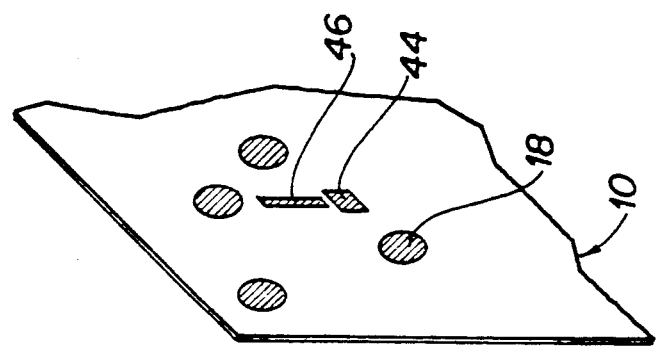
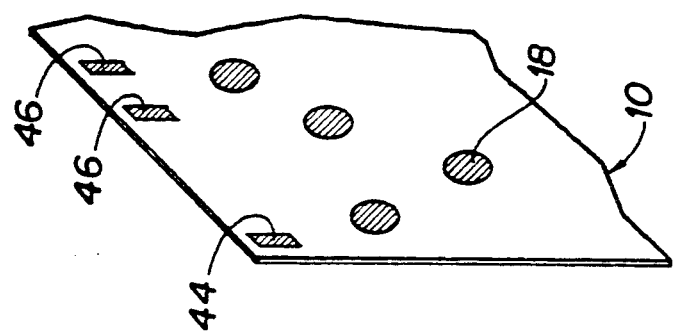
FIG 5

MATRIX ENCODING DEVICES AND METHODS

This invention relates to the automated identification of matrices placed on them together with imagers and related apparatus for interpreting the matrices.

BACKGROUND OF THE INVENTION

Automated identification of articles is a recent phenomenon which finds its advent in the invention of the integrated circuit and the availability of computing power at reasonable costs. In the late 1960's, for instance, a number of companies began to develop practical automated supermarket checkout systems, and a pilot system was installed in a Kroger store in Cincinnati, Ohio in 1967. One of the first scanners capable of reading the Universal Product Code bar code was installed at a supermarket in Troy, Ohio in 1974. More than 90% of all grocery items carried a UPC code by 1980. Since 1980, a torrent of information has been published on bar codes, and by December 1985, more than 12,000 grocery stores were equipped with scanner checkout systems. See, e.g., C. Harmon and R. Adams, *Reading Between the Lines—An Introduction to Bar Code Technology* (Helmers Publishing, Inc. 1989).

Bar codes have also been used for identification and characterization of responses to mass advertising efforts. U.S. Pat. No. 4,752,675 issued Jun. 21, 1988 to Zetmeir, for instance, discloses devices and methods for reading bar codes placed on advertising materials sent to particular addressees. The information interpreted from the bar codes is compared with master file lists for analysis of the effectiveness of the advertising.

Bar codes are typically read using lasers which scan from left to right, right to left, or in both directions (or other directions) across a field of alternating dark bars and reflective spaces of varying widths. Multiple scans are typically employed to minimize data errors. Because of the multiplicity of bars and spaces required for each alphanumeric character, bar codes require a relatively large space to convey a small amount of data. For instance, each character in the bar code system known as Code 39 requires five bars and four spaces. A high density Code 39 field corresponds to only 9.4 characters per inch.

Universal Product Codes are another common bar code. They are used primarily in the retail grocery trade and contain a relatively large number of bars and spaces which allow for error checking, parity checking and reduction of errors caused by manual scanning of articles in grocery stores. They accordingly require even larger space for conveyance of character information, in relative terms.

The Codabar code, which has been developed by Pitney Bowes and is used in retail price labeling systems and by Federal Express, is a self-checking code with each character represented by a stand-alone group of four bars and three interleaving spaces. Federal Express uses an eleven digit Codabar symbol on each airbill to process more than 450,000 packages per night. Other codes use varying bar and space techniques to represent characters. Because of error checking requirements and for other reasons, however, the space required to place a bar code on an article is relatively large.

In addition to the large surface area required for the series of bars and spaces that form a typical bar code symbol, the code must be placed on a background that has a high reflectance level. The high level of contrast, or reflectivity ratio, between the dark bars and the reflective spaces, allows the optical sensor in the reader to discern clearly and dependably the transitions between the bars and spaces in the symbol. Ideally, the printed bar should be observed as perfectly black and the spaces should be perfectly reflective. Because those ideal conditions are seldom possible, the industry typically requires that labeling media reflect at least 70% of incident light energy. Surface reflectivity and thus quality of the media on which the bar code is placed directly affects the successful use of the bar code on that media. Additionally, the media cannot be overly transparent or translucent, since those characteristics can attenuate reflected light. Accordingly, only limited types of highly reflective media may be used for placement of bar codes.

Space requirements for bar codes further include a "quiet zone" which must surround the field of bars and spaces. In many codes, this quiet zone constitutes a border of ¼ around the code symbol, thus requiring even more space for the bar code. These space and reflectivity limitations often require bar codes symbols to be conspicuous and aesthetically obtrusive.

Bar coding also requires very precise print methods. Assuming that the printing operation is capable of printing the required density to achieve the 70% reflectance ratio, careful attention must be paid to additional major factors that influence the bar code effectiveness. Those include ink spread/shrinkage; ink voids/specks; ink smearing; non-uniformity of ink; bar/space width tolerances; edge roughness and similar factors which must be closely controlled to ensure that the symbol will be easily scannable. In other words, the printer must pay careful attention to using paper or other media that displays the correct absorption properties properly inking the ribbon; carefully controlling hammer pressure; keeping the printhead and paper clean; properly wetting the paper and curing the ink; and maintaining proper adjustment of the printhead control mechanism. These printing details create additional problems and expenses, particularly for placement of bar code symbols on smaller items such as coupons and mail pieces.

SUMMARY OF THE INVENTION

The present invention employs a new type of coded matrix in order to allow identification of articles bearing the matrix with a minimum of aesthetic clutter, space, interpretation equipment expense and print control expense.

The matrix comprises a number of marks of any desired size and shape (hereinafter referred to in a non-limiting sense as "dots") which are arranged in a reference context or frame of one or more columns and one or more rows, together with a reference marker and a reference cue. The number of rows preferably corresponds to the number of characters contained in the symbology selected for the matrix; for instance, a matrix which is capable of conveying all the letters of the English language and ten numeral symbols would use 36 rows. The number of columns in the matrix preferably corresponds to the number of characters desired to be conveyed. The roles of the rows and columns in the reference frame may be reversed if desired. In the preferred embodiment, each column contains one or more dots corresponding to the character which is desired to be conveyed in that column.

The reference marker and reference cue may be formed of one shape, of two marks, or according to any other desired arrangement that allows interpretation of the matrix at any desired attitude with respect to the imaging equipment. The reference cue may form a part of the reference marker, or an information dot, if desired.

The matrix encoding scheme of the present invention takes advantage of recently developed and low cost charge-coupled device ("CCD") imagers. Such imagers contain a large number of optical elements or pixels; for instance, one high-end imager contains 1035 rows of 1320 columns of pixels, each of which interprets a small portion of the field of view and produces a discrete quantum of information corresponding to that portion of the field of view. Such imagers thus allow matrix symbols of the present invention to convey a large amount of information in a very small area.

Because typical CCD imagers sense at least 256 and frequently 4096 different brightness levels, the user can adjust the reflectance ratio of the matrix over a wide range in order to allow accurate decoding of the matrix with minimum errors. For that reason, such matrices may be placed on media of any desired quality, cost, color, finish and reflectance level. The ink used may be any desired color or colors, invisible fluorescent ink which may be illuminated with appropriate light when being read, or any other desired ink. The aesthetic effect of the matrix is further reduced since it appears simply as an arrangement of markers or dots on the article, rather than a series of bars and spaces.

Imagers according to the present invention are connected via suitable interfaces to computing equipment that contains processing and mass memory data storage capability appropriate for interpretation of the matrices, determination of the character strings represented by the matrices according to the selected symbology system, and, if desired, comparison of the character strings to data such as name and address lists and analysis of generated information for purposes such as analysis of effectiveness and efficiency of direct mail campaigns, analysis of sales efforts or customer or addressee responses, creation of additional information to enter into databases, and virtually any other application which includes identification, characterization or analysis of articles as necessary or desirable steps.

Matrices, devices and processes according to the present invention accordingly lend themselves particularly well to interpretation of direct mail pieces. The small space required, the inconspicuous or invisible dots and the possibility of attractive placement on virtually any type of background surface in virtually any type of desired ink reduce the expense of printing the matrices, and also reduce the possibility that recipients of the mail pieces will be reminded that their responses are being monitored.

It is accordingly an object of the present invention to provide matrices, devices and processes for encoding a large quantity of information on articles, in a small space, in an inconspicuous manner, at minimum expense, and decoding and interpreting the matrices dependably, quickly, and inexpensively.

It is another object of the present invention to provide processes for placing encoded information on printed matter such as direct mail pieces, coupons and tickets, in an invisible or unobtrusive manner.

It is a further object of the present invention to provide a matrix encoding system which may be employed to interpret data using readily available and inexpensive computing means and image reading means.

Other objects, features, and advantages of the present invention will become apparent with reference to the remainder of this document.

BRIEF DESCRIPTION OF THE DRAWINGS

FIG. 5 shows various schemes for reference marks and cues according to the present invention (other of which schemes are shown in other of the figures).

DETAILED DESCRIPTION OF THE DRAWINGS

Figure 1:
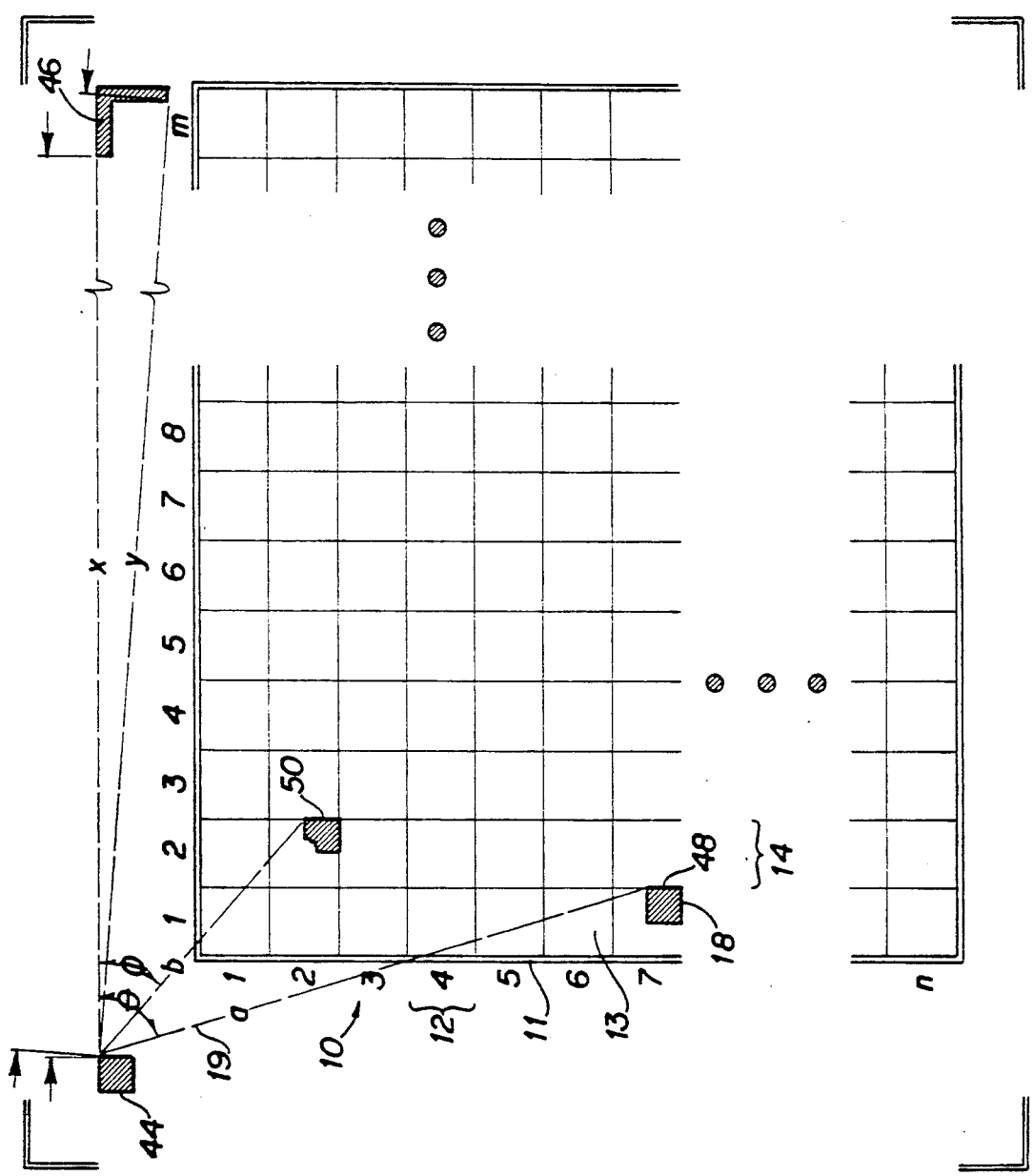
FIG. 1 shows a first embodiment of the matrix according to the present invention, together with a background reference frame.

FIG. 1 shows a preferred embodiment of a matrix 10 according to the present invention. Matrix 10 conceptually is placed in the context of a frame 11 which contains a number of rows 12 and columns 14. FIG. 1 uses a series of numerals to illustrate 1 through n rows and 1 through m columns in that reference frame 11. The numerals and the frame preferably are not used when the matrix is placed on an article according to the present invention, however. The matrix 10 can include any desired number of rows, each of which may correspond to an alphanumeric character or other symbol, word, or concept, and any desired number of columns, each of which corresponds to a character or symbol, word or concept desired to conveyed in the matrix.

The term "character" as used in this document means an alphanumeric character or other symbol, word, concept, or any other tangible or intangible entity which is desired to be mapped onto a combination of one or more dots. The term "symbology system" means the set of such characters, such as the English alphabet, the greek alphabet, numerals, an ASCII set, words in a conventional or artificial language, names and addresses in a list, organic chemical molecules, DNA sequences, concepts such as the different taste sensations which ma be experienced by the human tongue or colors in the spectrum, or any other tangible or intangible entities desired to be represented. The matrix 10 may also be configured so that each column 14 corresponds to a character and each row 12 corresponds to the character desired to be conveyed in matrix 10.

In the matrix 10 shown in FIG. 1, the dot 18 placed in column 1 corresponds to the numeral "7" and the dot placed in column 2 corresponds to the numeral "2." In the preferred embodiment only one dot is placed in each column. The mapping that occur thus corresponds to the vertical position of the dot in each column. Accordingly, a matrix having m columns for conveyance of m characters in a symbology system having n possible characters can convey $n^m$ different combinations. Matrices 10 according to the present invention are thus an efficient coding technique; for instance, a matrix of ten rows by ten columns can convey 10 billion difference combinations. Furthermore, even in applications where coding efficiency is irrelevant, but where one desires to use the matrix to record lengthy fields such as entire names and addresses, the matrix can, in a very small space, include m columns corresponding to the maximum number of characters anticipated in the longest name and address and 36 or more alphanumeric rows.

Figure 6:
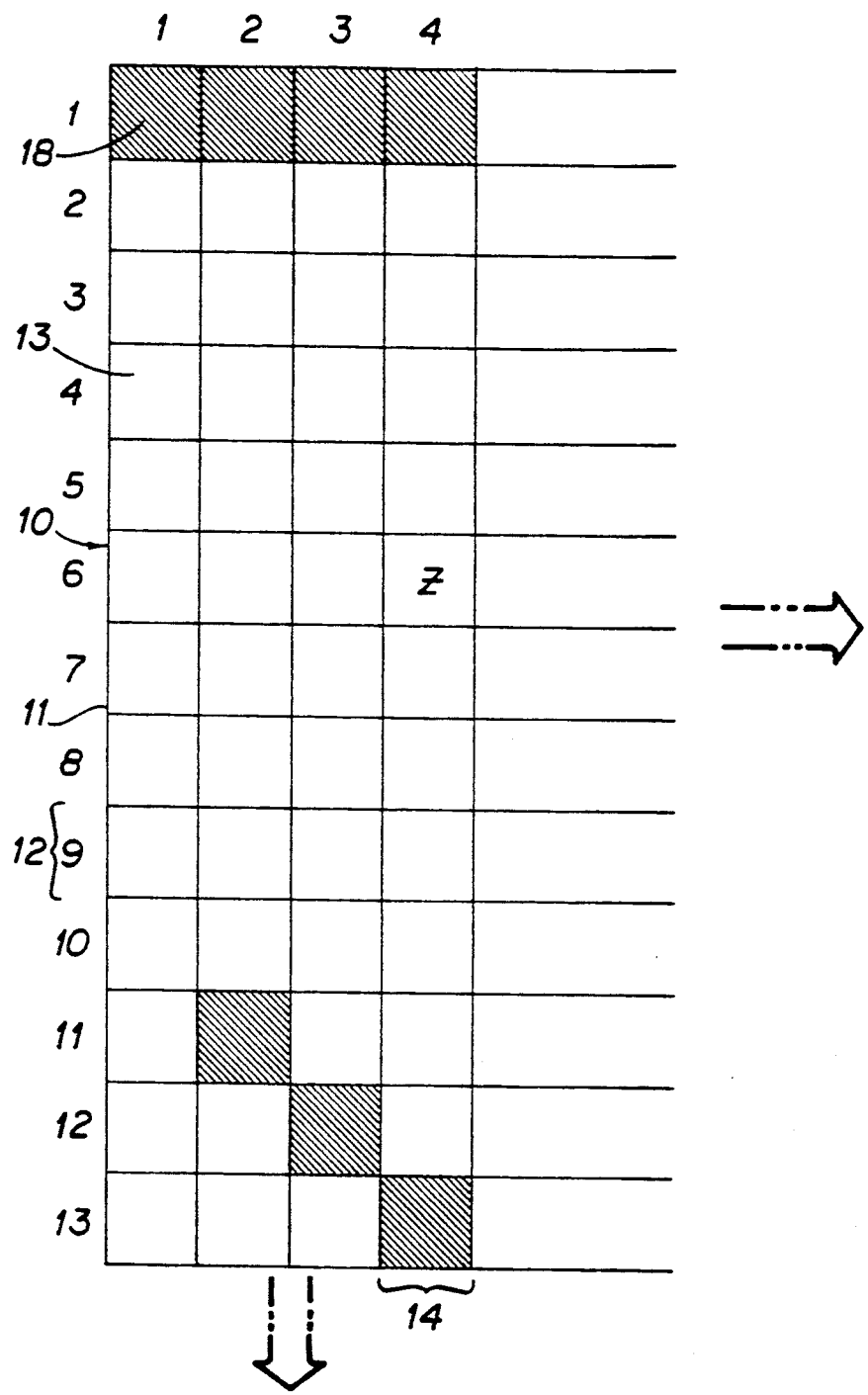
FIG. 6 shows a second embodiment of the matrix according to the present invention, which uses more than one information dot per row or column to represent a character in a particular symbology system.

More than one information dot 18 can be included in a dimension (row 12, column 14 or any other array of spaces or intersections 13 which extends in at least one dimension). FIG. 6 shows a scheme which uses two dots 18 in each column 14 as an example. According to this scheme, a dot 18 in one of the upper ten row-column interstices in the column 14 corresponds to a digit—the digit "1" in column 1, for instance. A dot 18 placed in the eleventh intersection 13 acts to "shift" the first ten interstices, to, for example, the first ten uncapitalized letters of the English alphabet. Thus, column two in FIG. 6, which contains a dot 18 in the first and eleventh intersection 13, represents the letter "a," and continuing with the scheme, column three, which contains a dot 18 in the first and twelfth intersection 13, represents the letter "k." The small letters of the alphabet end at the sixth intersection 13 in column four, and the remaining spaces in the frame 11 may be used for capital letters, greek symbols, other ASCII characters, and any other symbology system characters.

Each row 12 or column 14 of matrix 10 may obviously contain any number of dots 18 to represent a particular character set in a symbology system. According to this scheme, a column 14 of "q" intersections 13 could contain from one to "q" dots 18. The number of characters which could be represented by that column 14 would be, according to the binomial theorem:

$$q!/0!(q-0)! + q!/1!(q-1)! + q!/2!+ \ldots q!/q!(q-q)!$$

As an example, in order to demonstrate the power of such a system, a matrix 10 with a dimensional array containing only 9 intersections 13 could represent a character set of 512 characters, words, or concepts. Although present processing technology probably favors fewer numbers of dots 18, in order to allow imager 22 and computer 28 to process and use information rapidly, developments in computer hardware and software technology and in imaging capability will allow use of an increased number of dots 18 in a row 12 or column 14 and thus allow a far more compact and efficient mapping scheme as described above (or otherwise).

Figure 2:
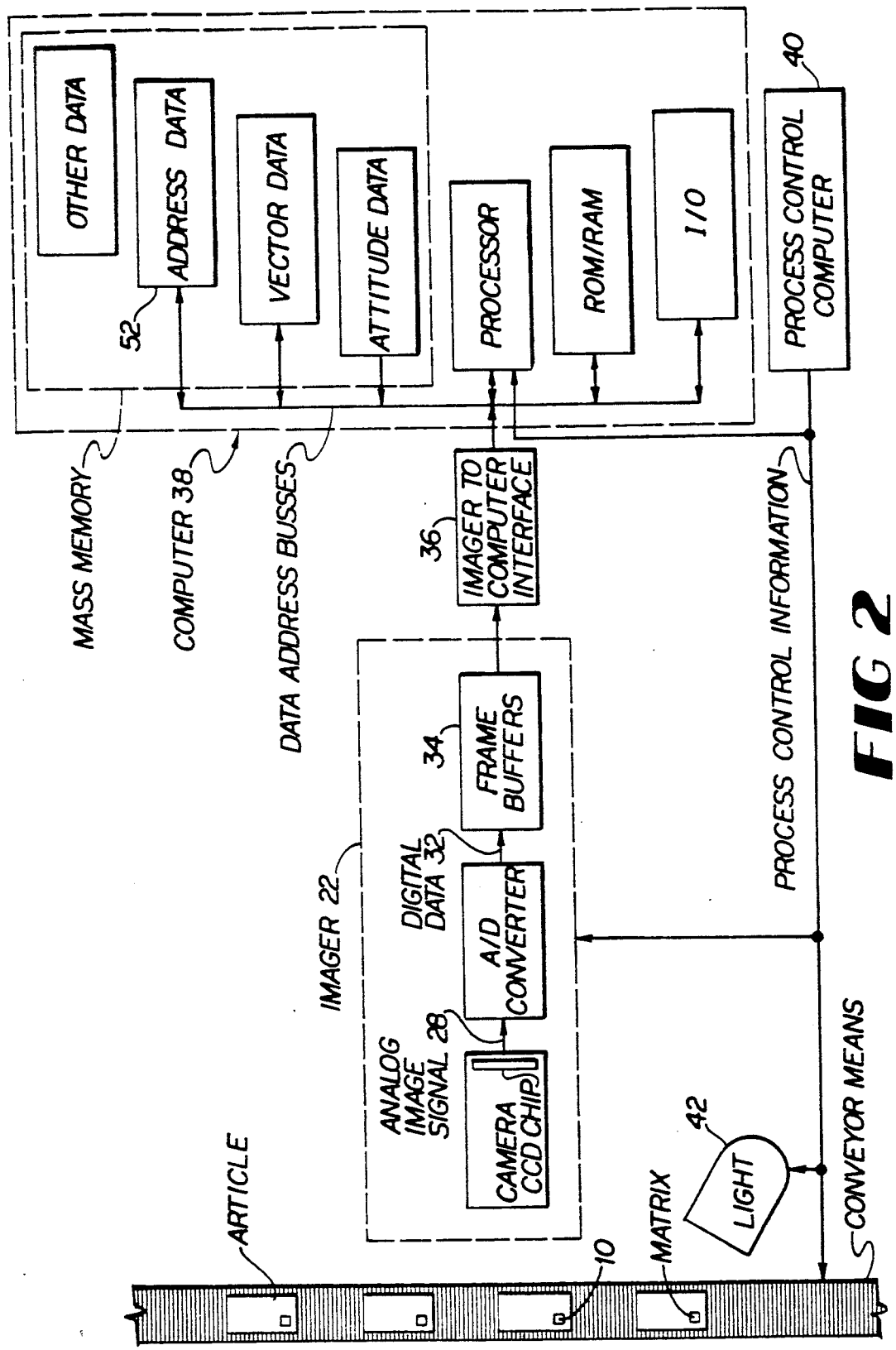
FIG. 2 shows, in block diagram form, apparatus for decoding matrices placed on articles according to the present invention.

Matrices 10 are preferably interpreted using an imager having a large number of optical elements 23 or "pixels." One system for accomplishing this task is shown schematically in FIG. 2. There the imager includes a CCD chip. Such imagers have recently become available on a wide scale and inexpensive basis. For instance, Santa Barbara Instrument Group of Santa Barbara, Calif. presently provides their Model ST4 for approximately $1,000. Spectra Source Instruments of Aguora Hills, Calif., provides their series of LYNX imagers for a similar amount of money. Both of those imagers, which are suitable for amateur astronomy applications are capable of exposures or "integrations" from 1/100 seconds up to 5 to 15 minutes. They thus enjoy incredibly short exposure times, as compared, for instance to a typical television camera which products exposures of 1/30th of a second. Such speed allows efficient and fast interpretation of many matrices, such as is required, for instance, in the processing and analysis of direct mail responses.

Furthermore, these imagers contain a very large number of optical elements 23, each of which senses and produces data corresponding to a very small increment of the entire field of view. As an example, the inexpensive imagers mentioned above use a CCD chip that contains an array of 192 by 165 optical elements. The largest CCDs readily available as of the date of this document include 2,048 by 2,048 pixels and sell for approximately $60,000. Imagers which are particularly suitable in the present invention include the Videk Megaplus Solid State CCD camera, which employs a chip featuring 1320 horizontal by 1035 vertical pixels in approximately a half-square inch field. The Videk camera is provided by Videk, a Kodak Company, whose address is Canandiagua, N.Y. Another CCD imager which has particular utility in the present invention, and which is sold with related interface and suitable computer capability as shown in FIG. 2, is provide under the EXPERT trademark by the Allen Bradley Company Industrial Control Group of Milwaukee, Wis. The EXPERT brand equipment is typically used for industrial quality control applications.

Figure 3:
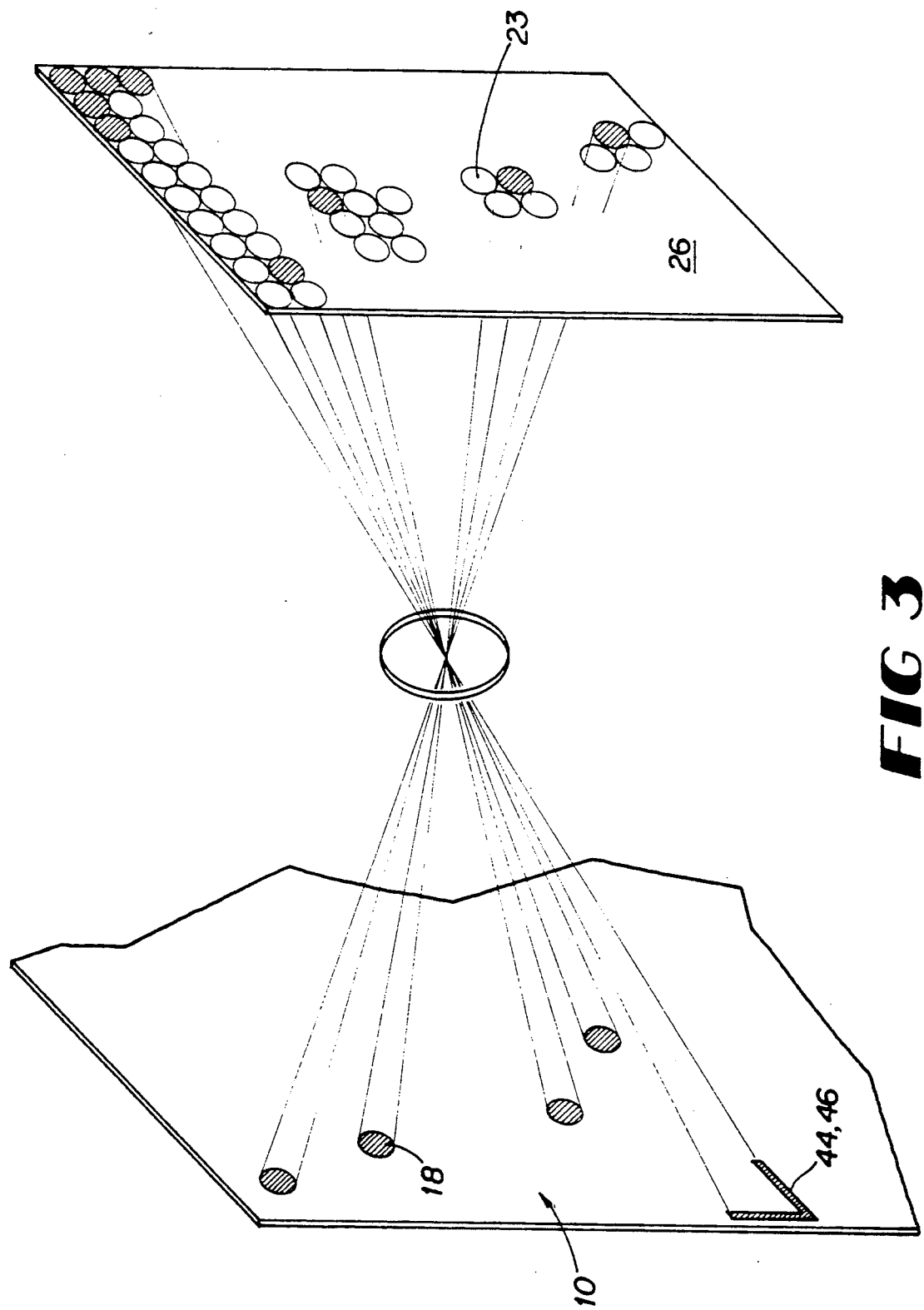
FIG. 3 shows, in schematic form, the mapping of pixels on a CCD integrated circuit ("chip") to dots on a matrix according to the present invention in a one-to-one relationship.

Regardless of the particular imager 22 chosen, it is clear that in order to be conservative, more than one optical element 23 may be assigned to the area corresponding to a dot 18 in a matrix 10 according to the present invention. At the outside, the matrix 10 could be made sufficiently small or the lens system of the imager 22 could be adapted to allow one dot 18 to map onto the area covered by a pixel 23. Accordingly, for an imager 10 which employs a lens system to map a matrix 10 onto a one-half square inch CCD chip 26 in a one-to-one size relationship, as shown for instance in FIG. 3, and assuming that one of the least expensive 192 by 165 pixel arrays is used, the dots in the matrix could each be as small as $1.57 \times 10^{-5}$ square inch for a one-to-one dot 18 to pixel 23 correspondence. The Videk CCD chip could similarly allow dots as small as $3.66 \times 10^{-7}$ square inch to be used.

Figure 4:
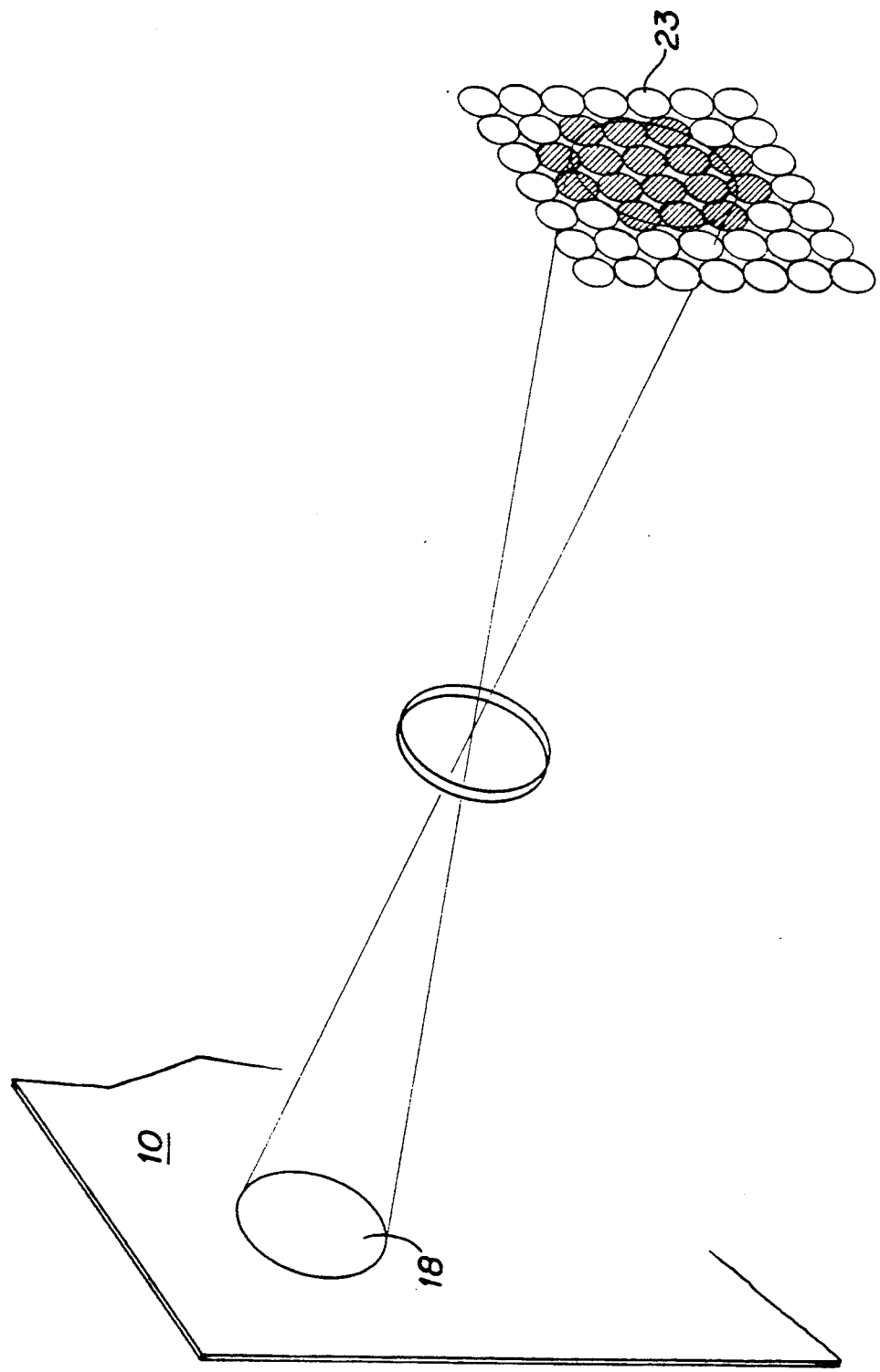
FIG. 4 shows, in schematic form, the mapping of pixels on a CCD chip to dots on a matrix according to the present invention in other than a one-to-one relationship.

A one-to-one correspondence between dots 18 and pixels 23 creates ample room for error, however, and accordingly the present invention contemplates assigning a group of pixels 23 to cover the area on the CCD chip 26 corresponding to each dot 18 in the matrix 10. One possible mapping is shown in FIG. 4. As a result, dots 18 such as the one shown in column 2, row 2, in FIG. 1, may be sensed by the CCD camera even if portions of them are missing, unlike in bar coding technology.

Since most CCD cameras can distinguish brightness over a range of at least of 256 levels, and some divide the brightness range into 4,096 steps, the user can typically adjust the sensitivity level necessary to product a positive signal from a pixel or group of pixel so that the imager records the presence of a dot when any desired reflectance ratio is reached. Accordingly, the present invention enjoys far more flexibility then bar coding applications which require a 70% reflectance ratio between dark and reflected areas.

A typical imager 22 as shown in FIG. 2 employs a CCD chip camera 24 containing a CCD chip 26. The camera 24 provides analog image signals 28 to a analog to digital converter 30. The A/D converter 30 receives information in serial form from charge-couple devices in the imager 22 and produces digital data 32 to be stored in frame buffers 34. Very briefly, as will be appreciated by those of ordinary skill in the relevant area, a charge-coupled device includes an array of light sensitive semiconductor elements. During an exposure, incoming photons cross a build-up of an electrical charge on each of the optical elements. In effect, the pixels accumulate tiny charges resulting from photons of light impacting electrons in the pixel's semiconductor strata. At the end of the exposure, which can be anywhere from a fraction of a second to several minutes, the pixels transfer their charges, in an orderly fashion, one row at a time, to a number of shift registers. Simultaneously, and in a conceptual sense, information is conveyed from rows of pixels to the shift registers one row after the next to produce a serial stream of data which is then stored with appropriate position information, preferably in digital form. The imager 22 information is provided to a computer interface 36 which conditions the digital information to allow for proper communication to a computer 38. Computer 38, interface 36 and imager 22 may be of the type provided under the EXPERT trademark by Allen Bradley Industrial Control Group of Milwaukee, Wis. Such imagers, interfaces and computers are typically and conventionally used for product quality control, but lend themselves very well to the precise nature of encoding matrices according to the present invention.

The computer 38 may be linked by process control computer 40, or directly, to the line which controls positioning of the articles on which the matrices 10 appear, so that the matrices 10 appear before the imager 22 in an orderly and efficient manner. A light 42 may be synchronized with the process control speed, if desired, to stroboscopically illuminate each matrix 10 as it appears before the imager 22.

The imager 22 through interface 36, provides data via a serial or parallel link to computer 38 in order to allow computer 38 to interpret the matrices 10. This task may be accomplished on a real time basis locally or over telephone lines or the information may be stored and provided after the matrices have been viewed by the imager 22.

In any event, the information for each exposure of the imager 22 (and thus each matrix 10 being interpreted) includes information corresponding to a number of dots, and their distances, and angles relative to each other. Referring again to FIG. 1, reference marker 44 may be considered as the conceptual focus of interpretation of data for each matrix 10. Reference marker 44 may appear, as shown in FIG. 1, at the upper left of matrix 10, or it can appear anywhere else desired as shown in FIG. 5, for instance. It, as is the case with all the other dots and cues printed in the matrix, may be printed of any desired type and color of ink, including fluorescent inks which may be exposed only with a fluorescent light 42, but which will appear invisible to the viewer.

A reference cue 46 is also placed on the matrix. FIG. 1 shows the cue near the upper right hand corner of the matrix 10, but other positions may be used, as shown, for instance, in FIG. 5. Reference cue 46 may be a dot, line, square or any other one or two-dimensional mark of any desired shape. It may also be contiguous to and form a part of reference marker 44, or it may be a part of all of an information dot 18. Computer 38 analyzes each set of data corresponding to a matrix 10 to analyze the distance between the reference marker 44 and each column dot, together with the angle between the column dot 18 and the reference cue 46 relative to reference marker 44.

Thus, in FIG. 1, the computer analyzes the data for matrix 10 to determine the distance "a" between reference mark 44 and column one's dot 48, together with angle $\Theta$ of column one's dot 48 to reference cue 46 relative to reference marker 44, as well as distance "b" from reference marker 44 from to column two's dot 50 and angle $\phi$ between column two's dot 50 and reference cue 46 relative to reference marker 44. The computer 38 thus produces vectors 19 corresponding to direction and distance of each column dot from reference marker 44. It may then compare such vectors 19 to information stored in a character database 52 relating to the symbology system used in the matrix 10 in order to identify the particular character in the symbology system corresponding to that vector 19. The computer may then store information for each character, and, if desired, compare such character information to information in that database or another relating to addressee information that includes names and addresses, or other information.

The computer 38 may calculate the angles between column dots 18 and reference cue 46 relative to reference marker 44 by analyzing data corresponding to one pixel 23 corresponding to a consistent position on each such marker or dot (such as, for instance, the right-hand top corner) where a group of pixels 23 corresponds to a dot in the matrix 10, so that angles and distances may be calculated consistently. Just as easily, the computer 38 may calculate a "center of gravity," assume when certain pixels 23 in a group sense presence of portions of a dot 18 that the center of that particular dot 18 is the position by which angles and distances are calculated, or employ any other desired means to consistently calculate angles and distances.

Reference cue 46 is preferably two dimensional. A two-dimensional reference cue is preferable since it may be analyzed by the computer 38 in three dimensions to account for the matrices 10 being nonparallel and/or rotated relative to the CCD chip 26 when read and for variations in distance of the matrices 10 from the chip 26. As shown in FIG. 1, for instance, computer 38 may calculate a distance "x" between the upper left tip of reference cue 46, and a distance "y" between reference marker 44 and lower right tip of reference cue 46. The computer could also analyze the angle between ray "x" and "y," or other desired two-dimensional information as desired, including variations in shape and size of a single reference marker 44/cue 46 shape relative to a standard size and shape. The computer 38 may accordingly determine distance scaling and attitudinal normalization information based on at least one distance and at least one angle, two or more distances, two or more angles, or a combination of distances and angles or shapes. The computer 38 then compares such information determined from data for a particular matrix 10 to a reference table in a database of attitude data 52 in order to produce vector attitude compensation information and/or distance scaling information to be applied to each vector corresponding to a column dot 18. The distances, such as "a" and "b" in FIG. 1, may thus be scaled and normalized to correspond to the distances that would have been seen by the imager 22 had the matrix 10 actually been at a uniform distance, and in a uniform attitude relative to the imager 22 when viewed.

It will also be apparent to those of ordinary skill in the art that the lens system of the imager 22, or other means such as infrared or parallax means, for instance, may be used for distance scaling purposes.

Matrix 10 according to the present invention may be used for encoding and verifying various products in a small area, with minimum conspicuousness. Variations include printing the matrix with invisible fluorescent ink over text copy, in blank portions of direct mail pieces, coupons, tickets or similar matter, in a variety of colors such as those typically used for such matter, in a white fluorescent ink on a black background, in low density print, on low cost paper lacking minimum optical properties required for bar codes, on a translucent substrate appropriate for particular direct mail pieces, coupons, tickets or similar matter, or on a high gloss cast-coated premium grade stock appropriate for promotion of premium items, as immediate, nonlimiting examples.

The matrices, interpretation devices and methods according to the present invention may be used for coupons, lottery tickets, security documents, envelopes, cards, labels, cartons, checks, containers, stocks, bonds and other applications requiring cross-reference identification. They may be used for auditing redemption coupons based on a mailing list of individuals or households, in order to analyze and develop demographic data, special interest mailing lists, sales analysis data and similar information, and are thus particularly well suited for direct mail applications. Similarly, the systems allow accurate, inexpensive and efficient verification of authenticity of lottery tickets, lotto tickets, security documents and similar articles. It also allows proper sorting and routing of mail envelopes, cards and postal items, by, for instance, activating or controlling distribution apparatus. Inventory control relating to specific products, manufacturing, accounting, sales data, or commercial package distribution forms yet another application for such systems, as does sorting of checks, stocks, bonds, and other documents. Other applications may be easily visualized. The matrix may also obviously be decoded manually, if desired.

The foregoing is provided for purposes of illustration and explanation. Modifications may be made to the embodiments as described above without parting from the scope or spirit of the invention.

What is claimed is:

1. A method of identifying an article having a matrix placed thereon and using an imager containing a plurality of optical elements for sensing images, comprising the steps of:
    a. illuminating the matrix with suitable light in order to allow the optical elements of the imager to sense the matrix;
    b. using the imager to obtain an image of the matrix placed on the article, which matrix comprises at least one reference marker, at least one column dot placed according to a reference frame containing at least one dimension corresponding in length to the number of characters contained in the symbology system, and at least one orientation cue;
    c. producing a serial stream of data from the optical elements of the imager;
    d. storing the data;
    e. interpreting from the data a vector for each column dot corresponding to the distance from the reference marker to the column dot and the angle of the column dot to the orientation cue relative to the reference marker as sensed by the optical elements;
    f. comparing the vectors to information stored in a database relating to the symbology system used; and
    g. identifying a character corresponding to each vector.

2. The method of claim 1 further comprising the step of comparing the information relating to the identified characters to information in a database relating to addressee information comprising names and addresses.

3. The method of claim 1 further comprising the step of stroboscopically illuminating the matrix in order to produce a stationary television image while the article is in motion.

4. The method of claim 1 in which the matrix is placed on the article in invisible fluorescent ink and further comprising the step of stroboscopically illuminating the matrix in order to produce a stationary television image while the article is in motion.

5. A method of identifying an article according to a desired symbology system having a related database, using an imager containing a plurality of optical elements for sensing images and in which the article has a matrix placed thereon, comprising the steps of:
    a. illuminating the matrix with suitable light in order to allow the optical elements of the imager to sense the matrix;
    b. using the imager to obtain an image of the matrix placed on the article, which matrix comprises at least one reference marker, at least one column dot placed according to a reference frame containing at least one dimension corresponding in length to the number of characters contained in the symbology system, and at least one two-dimensional orientation cue;
    c. producing a serial stream of data from the optical elements of the imager;
    d. storing the data;
    e. interpreting from the data attitude and distance information corresponding to two-dimensional information presented by the orientation cue, as sensed by the optical elements;
    f. comparing the attitude and distance information to attitude and distance information stored in the database in order to determine distance scaling and vector attitude compensation information relating to the attitude and distance of the matrix with respect to the optical elements of the imager;
    g. interpreting from the data a vector for each column dot corresponding to the distance from the reference dot to the column dot and the angle of the column dot to the orientation cue relative to the reference marker as sensed by the optical elements;
    h. compensating the vectors using the distance scaling and vector attitude compensation information in order to generate absolute vectors;
    i. comparing the absolute vectors to information stored in the database relating to the symbology system; and
    j. identifying a character corresponding to each vector.

6. The method of claim 5 further comprising the step of comparing the information relating to the identified characters to information in a database relating to addressee information comprising names and addresses.

7. The method of claim 5 further comprising the step of stroboscopically illuminating the matrix in order to produce a stationary television image while the article is in motion.

8. The method of claim 5 in which the matrix is placed on the article in invisible fluorescent ink and further comprising the step of stroboscopically illuminating the matrix in order to produce a stationary television image while the article is in motion.

9. A method of identifying an article, using an imager containing a plurality of optical elements for sensing images and in which the article has a matrix placed thereon, comprising the steps of:
   a. illuminating the matrix with a stroboscopic light producing source;
   b. using the imager to obtain an image of the matrix placed on the article, which matrix comprises at least one reference marker, at least one column dot placed according to a reference frame containing at least one dimension corresponding in length to the number of characters contained in the symbology system, and at least one two-dimensional orientation cue;
   c. producing a serial stream of data from the optical elements of the imager;
   d. storing the data;
   e. interpreting from the data attitude and distance information corresponding to two-dimensional information presented by the orientation cue, as sensed by the optical elements;
   f. comparing the attitude and distance information to attitude and distance information stored in a database in order to determine distance scaling and vector attitude compensation information relating to the attitude and distance of the matrix with respect to the optical elements of the imager;
   g. interpreting from the data a vector for each column dot corresponding to the distance from the reference dot to the column dot and the angle of the column dot to the orientation cue relative to the reference marker as sensed by the optical elements;
   h. compensating the vectors using the distance scaling and vector attitude compensation information in order to generate absolute vectors;
   i. comparing the absolute vectors to information stored in the database relating to the symbology system;
   j. identifying a character corresponding to each vector and storing information relating to each character identified; and
   k. comparing the information relating to the identified characters to information relating to addressee information comprising names and addresses.

10. Apparatus for identifying an article on which has been placed a matrix having at least one reference marker, at least one column dot placed according to a reference frame containing at least one dimension corresponding in length to the number of characters contained in the symbology system, and at least one orientation cue, comprising:
   a. an imager for obtaining an image of the matrix, which imager contains a plurality of optical elements for sensing images;
   b. means for producing a serial stream of data from the optical elements of the imager and storing the data;
   b. means for interpreting from the data a vector for each column dot corresponding to the distance from the reference marker to the column dot and the angle of the column dot to the orientation cue relative to the reference marker;
   d. a database containing information relating to the characters in the symbology system;
   e. means for (1) comparing the vectors to the information stored in the database and (2) identifying a character corresponding to each vector; and
   f. means for illuminating the matrix with suitable light in order to allow the optical elements of the imager to sense the matrix.

11. Apparatus according to claim 10 further comprising means for comparing the information relating to the identified characters to information in a database relating to addressee information comprising names and addresses.

12. Apparatus according to claim 10 further comprising means for stroboscopically illuminating the matrix in order to produce a stationary television image while the article is in motion.

13. Apparatus according to claim 10 in which the matrix is placed on the article in invisible fluorescent ink and further comprising means for stroboscopically illuminating the matrix in order to produce a stationary television image while the article is in motion.

14. Apparatus for identifying an article on which has been placed a matrix having at least one reference marker, at least one column dot placed according to a reference frame containing at least one dimension corresponding in length to the number of characters contained in the symbology system, and at least one two-dimensional orientation cue, comprising:
   a. an imager for obtaining an image of the matrix, which imager contains a plurality of optical elements for sensing images;
   b. means for producing a serial stream of data from the optical elements of the imager and storing the data;
   c. means for interpreting from the data attitude and distance information corresponding to two-dimensional information presented by the orientation cue;
   d. means for comparing the attitude and distance information to attitude and distance information stored in a database in order to determine distance scaling and vector attitude compensation information relating to the attitude and distance of the matrix with respect to the optical elements of the imager;
   e. means for interpreting form the data a vector for each column dot corresponding to the distance from the reference marker to the column dot and the angle of the column dot to the orientation cue relative to the reference marker as sensed by the optical elements;
   f. means for compensating the vectors using the distance scaling and vector attitude compensation information in order to generate absolute vectors;
   g. means for (1) comparing the absolute vectors to information contained in a database relating to the symbology system and (2) identifying a character corresponding to each vector; and
   h. means for illuminating the matrix with suitable light in order to allow the optical elements of the imager to sense the matrix.

15. Apparatus according to claim 14 further comprising means for comparing the information relating to the identified characters to information in a database relating to addressee information comprising names and addresses.

16. Apparatus according to claim 14 further comprising means for stroboscopically illuminating the matrix in order to produce a stationary television image while the article is in motion.

17. Apparatus according to claim 14 in which the matrix is placed on the article in invisible fluorescent ink and further comprising means for stroboscopically illuminating the matrix in order to produce a stationary television image while the article is in motion.

18. Apparatus for identifying an article on which has been placed a matrix having at least one reference marker, at least one column dot placed according to a reference frame containing at least one dimension corresponding in length to the number of characters contained in the symbology system, and at least one two-dimensional orientation cue, comprising:
  a. an imager for obtaining an image of the matrix, which imager contains a plurality of optical elements for sensing images;
  b. means for stroboscopically illuminating the matrix in order to allow the optical elements to sense a stationary image of the matrix while it is in motion;
  c. means for producing a serial stream of data from the optical elements of the imager and storing the data;
  d. means for interpreting from the data attitude and distance information corresponding to two-dimensional information presented by the orientation cue;
  e. means for comparing the attitude and distance information to attitude and distance information stored in a database in order to determine distance scaling and vector attitude compensation information relating to the attitude and distance of the matrix with respect to the optical elements of the imager;
  f. means for interpreting from the data a vector for each column dot corresponding to the distance from the reference marker to the column dot and the angle of the column dot to the orientation cue relative to the reference marker as sensed by the optical elements;
  g. means for compensating the vectors using the distance scaling and vector attitude compensation information in order to generate absolute vectors;
  h. means for comparing the absolute vectors to information contained in a database relating to the symbology system in order to identify the character corresponding to each vector;
  i. means for storing information relating to each character identified; and
  j. means for comparing the information relating to the identified characters to information in a database relating to addressee information comprising names and addresses.

19. Apparatus according to claim 18 in which the matrix is placed on the article in invisible fluorescent ink and the means for illuminating the matrix provides suitable light in order to allow the optical elements of the imager to sense the matrix.

* * * * *

UNITED STATES PATENT AND TRADEMARK OFFICE
CERTIFICATE OF CORRECTION

PATENT NO. : 5,128,528
DATED : July 7, 1992
INVENTOR(S) : Byrne E. Heninger It is certified that error appears in the above-identified patent and that said Letters Patent is hereby corrected as shown below:

Column 1, line 5, after the word "of" insert --articles using--

Column 2, line 20, after "¼" insert --"--

Column 2, line 35, after the word "properties" insert --;--

Column 4, line 53, delete "ma" and insert --may--

Column 5, line 38, after "$_2$" insert --$_{l(q-2)}$--

Column 6, line 59, delete "pixel" 2nd occurrence, insert --pixels--.

Column 6, line 67, delete "a" and insert --an--

Column 12, line 48, delete "form" and insert --from--

Signed and Sealed this

Thirty-first Day of August, 1993

Attest:

BRUCE LEHMAN

*Attesting Officer*      *Commissioner of Patents and Trademarks*